(12) United States Patent
Colley

(10) Patent No.: US 7,330,016 B2
(45) Date of Patent: Feb. 12, 2008

(54) INDUCTION GENERATOR POWER SUPPLY

(76) Inventor: Bruce H. Colley, 3529 Boyer Cir., Lafayette, CA (US) 94549

( * ) Notice: Subject to any disclaimer, the term of this patent is extended or adjusted under 35 U.S.C. 154(b) by 631 days.

(21) Appl. No.: 10/968,307

(22) Filed: Oct. 19, 2004

(65) Prior Publication Data
US 2005/0127880 A1    Jun. 16, 2005

Related U.S. Application Data

(63) Continuation-in-part of application No. 10/255,955, filed on Sep. 27, 2002, now Pat. No. 7,094,276.

(60) Provisional application No. 60/326,412, filed on Oct. 1, 2001.

(51) Int. Cl.
*H02P 9/00* (2006.01)

(52) U.S. Cl. .............................. 322/47; 322/89; 322/99

(58) Field of Classification Search ............... 322/29, 322/36, 47, 89, 99; 290/40 R, 41, 40 C
See application file for complete search history.

(56) References Cited

U.S. PATENT DOCUMENTS

| | | | |
|---|---|---|---|
| 4,417,194 A | 11/1983 | Curtiss et al. | |
| 4,677,364 A | 6/1987 | Williams et al. | |
| 4,992,721 A | 2/1991 | Latos | |
| 5,038,094 A | 8/1991 | Rashid | |
| 5,039,933 A | 8/1991 | Dong | |
| 5,105,096 A | 4/1992 | Waldschmidt et al. | |
| 5,225,973 A | 7/1993 | Patel et al. | |
| 5,281,905 A * | 1/1994 | Dhyanchand et al. | ......... 322/32 |
| 5,285,147 A | 2/1994 | Rashid | |
| 5,525,894 A | 6/1996 | Heller | |
| 5,559,704 A | 9/1996 | Vanek et al. | |
| 5,587,647 A * | 12/1996 | Bansal et al. | .................. 322/45 |
| 5,689,175 A | 11/1997 | Hanson et al. | |
| 5,929,612 A | 7/1999 | Eisenhaure et al. | |
| 5,986,438 A * | 11/1999 | Wallace et al. | ................ 322/20 |
| 6,815,934 B2 * | 11/2004 | Colley | .......................... 322/47 |

FOREIGN PATENT DOCUMENTS

GB        2 196 448 A       4/1988

* cited by examiner

*Primary Examiner*—Nicholas Ponomarenko
(74) *Attorney, Agent, or Firm*—James F. Hann; Haynes Beffel & Wolfeld LLP (57) ABSTRACT

A method for enhancing the operation of an electrical power supply includes selecting a prime mover having a chosen power rating. An induction motor having a first power rating at a rated speed and a second power rating at an overspeed is chosen. The overspeed may be at least about 10%, or at least about 25%, 50%, 75%, 10 to 300%, 25 to 300%, or 50 to 100%, greater than the rated speed. The induction motor may be chosen so that the second power rating is substantially the same as the chosen power rating of the prime mover. The induction motor is driven by the prime mover so that the induction motor acts as an induction generator. The system may also comprise a control module to monitor the performance of the power supply and to provide a throttle control signal in response to a control parameter signal. A circuit input of a phase shift circuit may be connected to a generator output. A converter input of an AC to DC converter may be connected to a circuit output of the phase shift circuit. A reservoir input of an energy reservoir may be connected to a converter output of the AC to DC converter.

24 Claims, 7 Drawing Sheets

INDUCTION GENERATOR POWER SUPPLY

CROSS-REFERENCE TO RELATED APPLICATION

This application is a continuation in part of U.S. patent application Ser. No. 10/255,995 filed Sep. 27, 2002, which application claims the benefit of provisional patent application No. 60/326,412 filed Oct. 1, 2001 and entitled "Induction Generator for AC or DC Applications".

BACKGROUND OF THE INVENTION

This invention relates to the use of induction motors as generators and describes various means to make such use both practical and economical in applications such as hybrid electric vehicles and independent power generation.

Electric vehicles have suffered from disadvantages of limited driving range and the time required to recharge batteries. The recent introduction of hybrid electric vehicles by major manufacturers has demonstrated that when an electric drivetrain is combined with an engine powered generator, there are significant benefits in terms of range, emissions levels and fuel economy and there is no recharging time since the batteries are recharged from the on board generator while the vehicle is being driven. These range and emissions benefits are made possible by the manner in which the engines are used.

Engines used in many conventional applications such as transportation, construction and farming machinery, or engines used to power generators, must be sized so as to meet peak power requirements, but are generally run at average power levels which are far less than this peak power. In addition, the operating level typically varies widely in power and speed. If a smaller engine is run at the average power level of such a larger engine and at a nearly constant power and speed level, it will produce the same amount of energy over time as the larger engine, but it can have considerably better fuel economy and lower emissions than the larger engine. To be workable, such a configuration requires an energy reservoir to buffer the difference between the power required and the power supplied. By using such a smaller engine and coupling it to a DC generator which in turn charges a battery bank, this concept becomes a practical reality. A properly sized battery bank can be charged by the engine-generator at a fairly constant rate, while having the capability of providing peak power levels of, for example, over ten times the average or rated power of the system. For hybrid electric vehicles or other applications requiring mechanical power, a DC motor with motor controller can be connected to the battery bank. For independent AC power generation, a DC to AC inverter can be connected to the battery bank. This technology is referred to generally as "hybrid electric technology", as it uses a combination of a prime mover—generator and an energy storage device. Generators that have traditionally been used in such hybrid electric systems are generally of the following types:

Synchronous—Automotive type (alternators), or commercial/industrial;
Shunt wound DC; and
Permanent magnet.

Induction Motors and Generators—Overview

It is well known that an induction motor can be used as a generator. Practical limitations, however, have restricted the use of such induction generators. The advantages of using induction motors as generators are many, and typically include the following:

1. Induction motors are readily available and very inexpensive per HP.
2. Induction motors are quite efficient (almost 90% even in small sizes for three phase units, and over 95% for larger units), and when run as generators, this efficiency is comparable. (Nailen, Richard L. How Induction Generators Work; Electrical Apparatus Magazine, June 1980, p. 55, 56.)
3. Induction motors are available in a wide power range, so this approach is very scalable.
4. Induction motors are very rugged, low maintenance machines. One reason is that they are brushless. There is no commutator or slip rings that must conduct current through brushes that are subject to wear and require maintenance. There are also no windings on the rotor that would be subject to mechanical stresses and failure.

An AC motor or generator, whether synchronous or induction (asynchronous) operates on the principle of a rotating magnetic field. The rate of rotation of this field is equal to the synchronous speed of the machine, and this speed, Ns, is determined according to the formula $Ns=120f/P$ where f equals the line frequency in Hz and P equals the number of poles in the machine. Therefore, for 60 Hz power input, the synchronous speed for a two pole machine is 3600 RPM, and 1800 RPM for a four pole machine. The rotor of a synchronous machine, whether motor or generator, operates at the synchronous speed. The rotor of an induction machine, if a motor, rotates below the synchronous speed and, if a generator, above the synchronous speed. (The difference between the synchronous speed and the rotor speed of an induction machine is called the slip.) This induction machine is simply an electric transformer whose magnetic circuit is separated by an air gap into two portions (rotor and stator) which move relative to one another. In the same manner that a transformer requires a magnetizing current (often referred to as an excitation current) in order to produce magnetic flux in the transformer core, an induction generator also requires a magnetizing current in order to produce flux in the rotor and stator cores, and therefore voltage at the output terminals. When connected to an existing AC power source, such as the utility power grid, this magnetizing current can be drawn from that source. However, if the generator is used to generate power independently, and is not connected to another AC power source, then another means must be used to provide this magnetizing current. This can be achieved by connecting capacitors to the output leads. (Bassett, E. D. and Potter, F. M. Capacitive Excitation for Induction Generators; Trans. Amer. Inst. Elec. Engrs., May 1935, Vol. 54, p. 540.) However, an induction generator can only be used to power resistive loads. (Nailen, Richard L. How Induction Generators Work; Electrical Apparatus Magazine, June 1980, p. 53.) If a reactive (inductive or capacitive) load is connected to an independent induction generator, the magnetizing current will be affected, and the output voltage will be lowered or raised, depending on the type and magnitude of the reactive load. The resulting instability of the output voltage renders the generator unsuitable for normal operation, since a fairly constant voltage is normally required. Various compensating schemes to offset the effect of reactive loads on the magnetizing current can become expensive and complex. Since reactive AC power loads are extremely common, the induction generator has been of limited usefulness for independent AC power generation.

This invention uses induction motors as generators in a manner which overcomes these limitations. Other features and advantages will appear from the following description in which the invention has been discussed in detail in conjunction with the accompanying drawings.

SUMMARY OF THE INVENTION

A first aspect of the invention is directed to an induction generator power supply comprising a prime mover, an induction generator operably connected to the prime mover and having a generator output, and a phase shift circuit, having a circuit input and a circuit output, the circuit input connected to the generator output. The power supply also comprises an AC to DC converter, having a converter input and a converter output, the converter input connected to the circuit output, and an energy reservoir having a reservoir input connected to the converter output. The prime mover may comprise an internal combustion engine, such as a diesel engine.

A second aspect of the invention is directed to a method for enhancing the operation of an electrical power supply. A prime mover having a chosen power rating is selected. An induction motor having a first power rating at a rated speed and a second power rating at an overspeed is chosen. The overspeed is at least about 10% greater than the rated speed. The induction motor is chosen so that the second power rating is substantially the same as the chosen power rating of the prime mover. The induction motor is driven by the prime mover so that the induction motor acts as an induction generator. The induction generator is operated at the overspeed. The overspeed may also be at least about 25%, 50%, 75%, 10 to 300%, 25 to 300%, or 50 to 100% greater than the rated speed.

A third aspect of the invention is directed to a method for enhancing the operation of an electrical power supply. An induction generator power supply is selected. The induction generator comprises a prime mover having a chosen power rating and an induction motor operably connected to the prime mover so that the induction motor acts as an induction generator. The induction motor comprises a generator output, a first power rating at a rated speed and a second power rating at an overspeed, said second power rating being substantially equal to the chosen power rating. The overspeed is at least about 25% greater than the rated speed. The power supply also includes a phase shift circuit, having a circuit input and a circuit output, the circuit input connected to the generator output, an AC to DC converter, having a converter input and a converter output, the converter input connected to the circuit output, and an energy reservoir having a reservoir input connected to the converter output. The induction generator is driven by the prime mover. The induction generator is operated at said overspeed.

A fourth aspect of the invention is directed to a controlled induction generator power supply system comprising an induction generator power supply comprising a prime mover. The prime mover comprises a throttle and a prime mover output, an induction motor operably connected to the prime mover output so that the induction motor acts as an induction generator, the induction motor comprising a generator output, an energy reservoir having a reservoir input, and a circuit electrically coupling the generator output with the reservoir input to provide the energy reservoir with energy. The system also comprises a control module, a transducer operably coupled to the induction generator power supply and to the control module. The transducer is adapted to monitor the performance of the power supply and to provide the control module with a control parameter signal. A servomechanism throttle control is operably coupled to the control module along a throttle control line and to the throttle. The control module provides the throttle control with a throttle control signal along the throttle control line in response to the control parameter signal. The control module may also comprise an isolator, a voltage converter coupled to the isolator and a diode coupled to be voltage converter.

A fifth aspect of the invention is directed to a controlled induction generator power supply system comprising an induction generator power supply. The induction generator power supply comprises a prime mover comprising a prime mover output, an induction motor operably connected to the prime mover output so that the induction motor acts as an induction generator, the induction motor comprising a generator output, an energy reservoir having a reservoir input and a circuit electrically coupling the generator output with the reservoir input to provide the energy reservoir with energy, said circuit comprising a DC to DC converter. The system also comprises a control module operably coupled to the DC to DC converter by a control line and a transducer operably coupled to the induction generator power supply and to the control module. The transducer is adapted to monitor the performance of the power supply and to provide the control module with a control parameter signal. The control module provides the DC to DC converter with a control signal along the control line in response to the control parameter signal.

A sixth aspect of the invention is directed to a method for enhancing the performance of an electrical power supply. A prime mover having a chosen power rating is selected. An induction motor is chosen. The induction motor is operably connected to the prime mover so that the induction motor acts as an induction generator. The induction motor comprises a generator output, a first power rating at a rated speed and a second power rating at an overspeed, said second power rating being substantially equal to the chosen power rating, the overspeed being at least about 10% greater than the rated speed. A circuit input of a phase shift circuit is connected to the generator output. A converter input of an AC to DC converter is connected to a circuit output of the phase shift circuit. A reservoir input of an energy reservoir is connected to a converter output of the AC to DC converter. The induction generator therefore may be driven by the prime mover and operated at the overspeed.

The present invention helps to make hybrid electric technology a much more practical means for realizing benefits of increased fuel economy and decreased emissions levels. The present invention is based in part on the recognition that a solution for overcoming the disadvantage of the induction generator's inability to power reactive loads is to rectify the output. If three phase power is rectified, the result is a low ripple, almost pure DC waveform. Pure DC power is resistive and not reactive, since there is no time variation in the voltage waveform that can cause the voltage and current to be out of phase. For AC loads (resistive or reactive) a DC to AC inverter can then be added. An induction generator is therefore well suited for such applications since its above-mentioned advantages can then be realized, while its major disadvantage is overcome. Conversion to DC power also makes it possible to take advantage of energy storage, such as in a battery bank. Utilization of the induction generator in this manner then leads to two broad areas of application.

Applications requiring mechanical power such as hybrid electric vehicles.

Applications requiring DC electrical power, or (by adding a DC to AC inverter) AC electrical power.

For either application, using such an approach now allows the engine (or other prime mover) and the generator to be sized according to the average power requirements instead of the peak power requirements. (Examples of other prime movers include an external combustion engine, or a wind or water turbine.) The battery bank must then be sized so as to be capable of powering the higher than average loads for expected periods of duration at the expected power levels. (Alternatively, other means of energy storage such as a capacitor bank, inductor, flywheel, elevated water storage, or compressed air could be utilized, but a battery bank appears to be the most practical for most applications.) For independent AC power generation, the use of modern sine wave inverters results in a very low distortion sine wave output, and such devices can power single phase or three phase resistive loads, or reactive loads with power factors of 0 to 1.0. Thus, the limitation of the induction generator in powering only resistive loads has been overcome, and the result is a generator that is available in a wide power range that is more rugged and less costly than was previously possible.

Compared to the present invention, conventional generators that have traditionally been used in hybrid electric systems (1. synchronous, automotive type (alternators), or commercial/industrial, 2. shunt wound DC, or 3. permanent magnet) have one or more of the following disadvantages:

Higher cost

Lower efficiency

Brushes or slip rings subject to wear or failure

Windings on the rotor that are subject to mechanical stresses and failure

Availability in only low or low to medium power ranges

Rated rotational speeds that are higher than most engine speeds, therefore requiring the addition of a transmission in order to attain the rated output of the generator.

Other features and advantages of the invention will appear from the following description in which the invention has been set forth in detail in conjunction with the accompanying drawings.

DETAILED DESCRIPTION OF THE INVENTION

Figure 1:
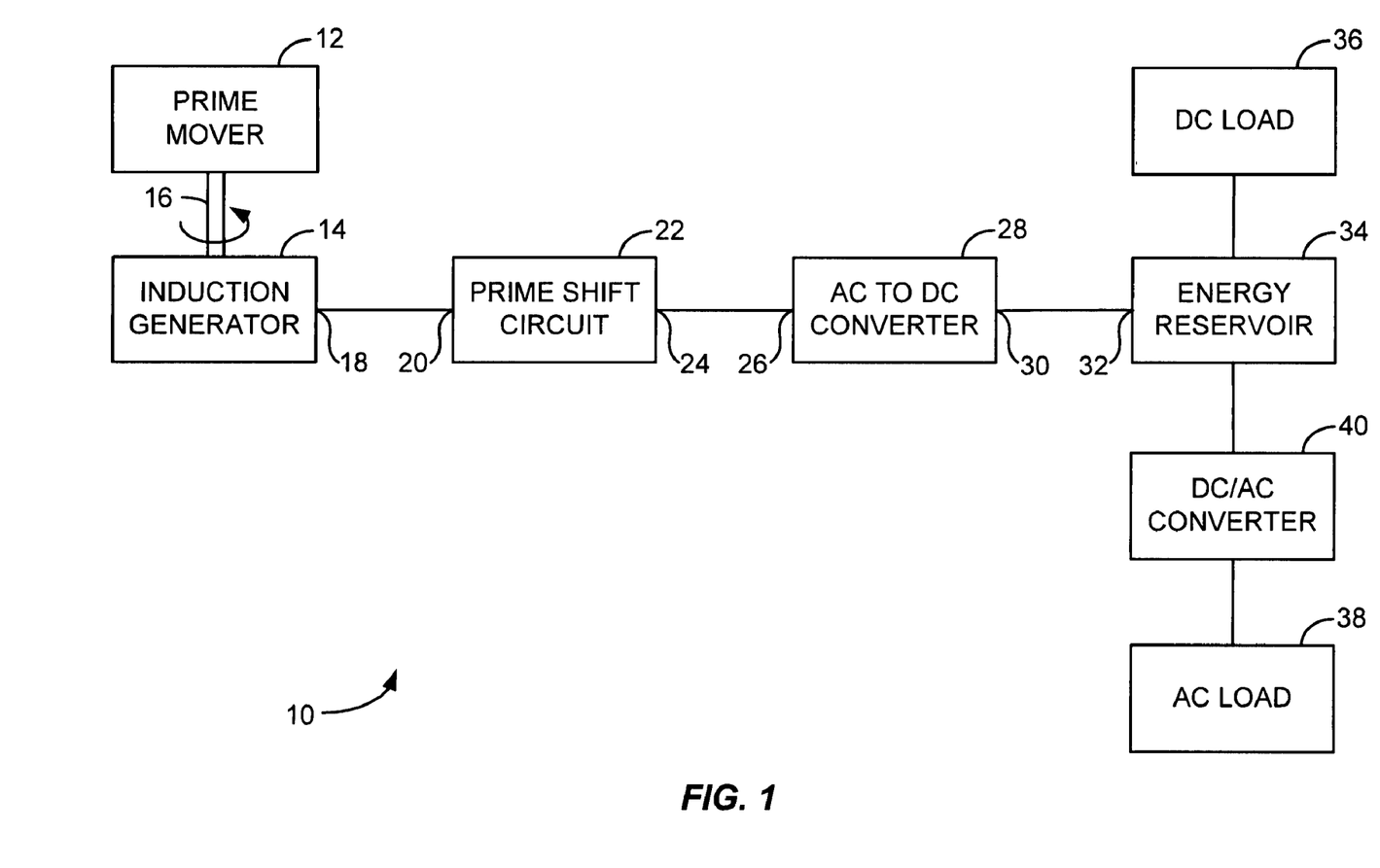
FIG. 1 is a general, schematic representation of an induction generator power supply made according to the invention.
Figure 2:
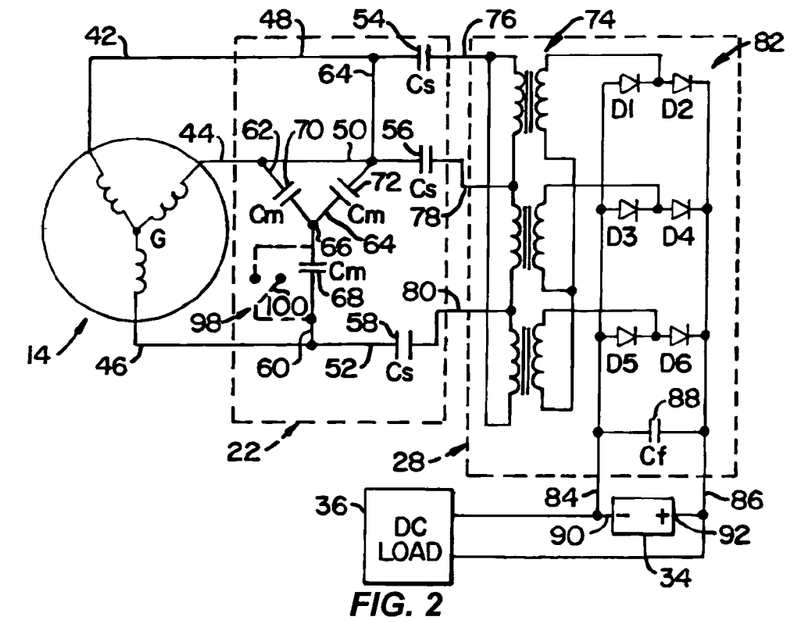
FIG. 2 is a schematic representation of a first embodiment of the invention of FIG. 1, except that the prime mover powering the induction generator is not shown.

FIG. 1 illustrates an induction generator power supply 10 made according to the invention in a general, schematic form. Power supply 10 comprises a prime mover 12, such as a diesel engine or other internal combustion engine, connected to an induction generator 14 through a drive coupling 16. Induction generator 14 is sized, along with prime mover 12, to provide the average power required by the load. Other prime movers, such as external combustion engines, wind turbines or water turbines, could also be used. Induction generator 14 has a generator output 18 connected to the circuit input 20 of a phase shift circuit 22. Circuit 22 has a circuit output 24 connected to the converter input 26 of an AC to DC converter 28. Converter 28 has a converter output 30 connected to the reservoir input 32 of an energy reservoir 34. Energy reservoir 34 is typically a battery bank; other energy reservoirs, such as a capacitor bank, an inductor, a flywheel, elevated water storage and compressed air storage, could also be used. When energy reservoir 34 is a battery bank, the energy reservoir may be connected directly to a DC load (a resistive load) 36 as shown in FIG. 2. When power supply 10 is used to power an AC load (a resistive or reactive load) 38, power supply 10 also includes a DC to AC converter 40 to transform the DC from energy reservoir 34 to AC.

Figure 1A:
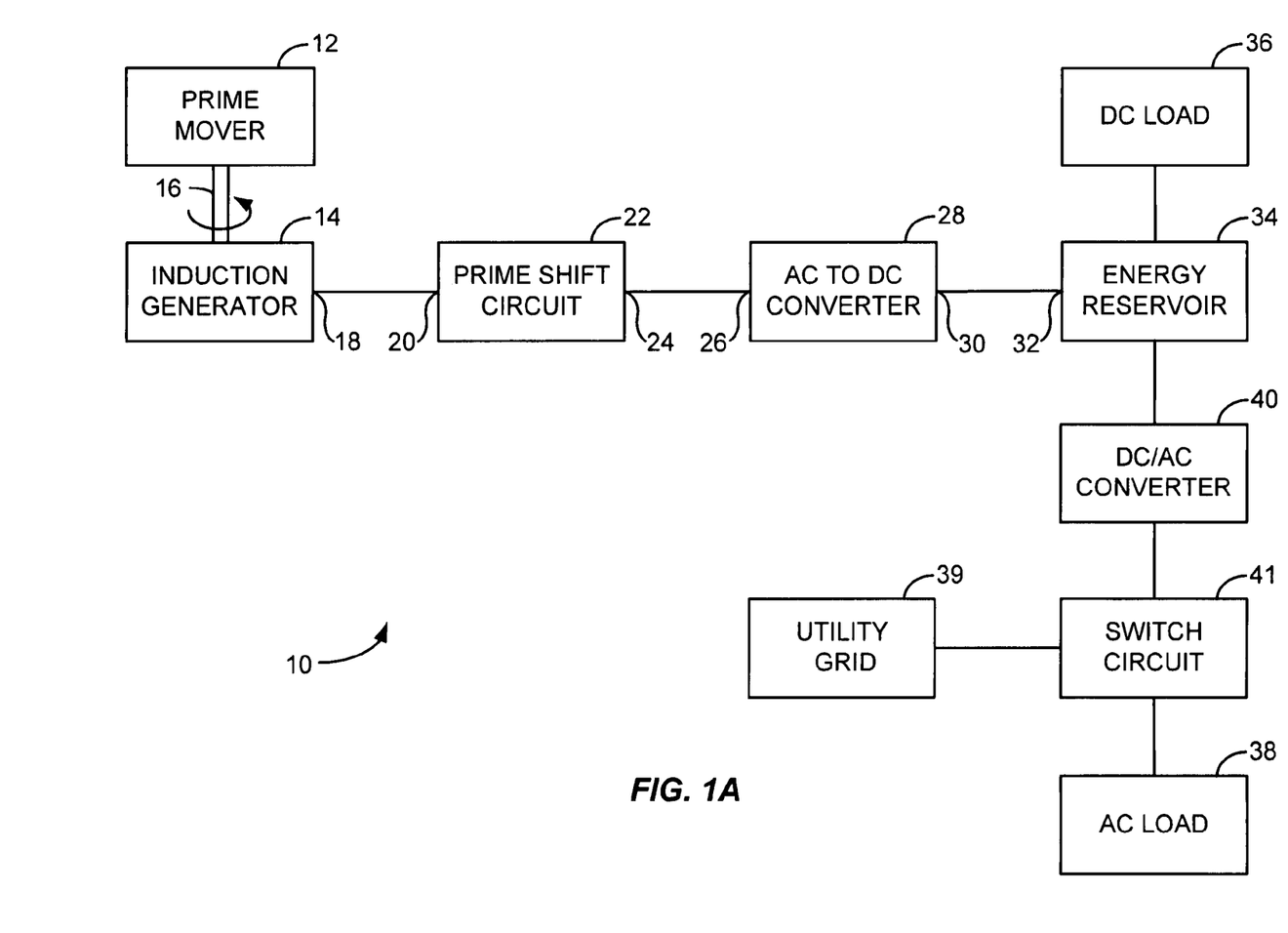
FIG. 1A illustrates an induction generator power supply similar to that of FIG. 1 with the option of the connection of the DC/AC converter to either an AC load or a utility grid, or both, through a switch circuit.

FIG. 1A illustrates an induction generator power supply similar to that of FIG. 1. The main difference is the connection of DC/AC converter 40 to either AC load 38 or a utility grid 39, or both, through a switch circuit 41. In this manner utility grid 39 serves as an energy reservoir which can be in addition to, or in place of energy reservoir 34. For example, prime mover 12/induction generator 14 can produce power at peak power usage periods in amounts which put power back into the grid while satisfying the user's needs. During off peak periods, prime mover 12/induction generator 18 can, if appropriate, be shut off and the user can draw power from utility grid 39. It is therefore possible for the user to reduce the net utility energy consumption to zero, while providing a benefit to utility grid 39 primarily by contributing to the peak power supply. In this way, utility grid 39 serves as an energy reservoir on the AC side of the generator system.

FIG. 2 illustrates one preferred embodiment of the invention with like reference numerals referring to like elements. Induction generator 14 may be a conventional three phase induction motor having first, second and third output lines 42, 44 and 46, the output lines corresponding to generator output 18 of FIG. 1. Phase shift circuit 22 comprises first second and third phase shift lines 48, 50 and 52 connected to the first, second and third output lines 42, 44 and 46. Phase shift circuit 22 is used to provide magnetizing current to the generator.

First, second and third series capacitors 54, 56 and 58 are situated along first, second and third phase shift lines 48, 50 and 52. First, second and third magnetizing current lines 60, 62 and 64 connect first, second and third phase shift lines 48, 50 and 52 to a common junction 66.

First, second and third magnetizing current capacitors 68, 70 and 72 are situated along the first, second and third magnetizing current lines 60, 62 and 64. Magnetization current for induction generator 14 is provided by capacitors 54, 56, 58, 68, 70 and 72; alternatively, with slight changes to the values of the capacitors, series capacitors 54, 56 and 58 could be placed along first, second and third output lines 42, 44 and 46 with little change in performance.

AC to DC converter 28 comprises a transformer 74, having transformer inputs 76, 78, 80, corresponding to converter input 26, coupled to a full wave rectifier 82. Transformer 74 preferably converts the output voltage from phase shift circuit 22 to a voltage which, when rectified, will result in the desired voltage at the input of the load. Converter 28 has a pair of output leads 84, 86, corresponding to converter output 30, across which is located an output filtering capacitor 88. Output leads 84, 86 are connected to the negative and positive terminals 90, 92 of energy reservoir 34, reservoir 34 in this embodiment being a battery bank 34. Terminals 90, 92 of the battery bank 34 correspond to reservoir input 32. DC load 36 is also connected to terminals 90, 92.

Figure 3:
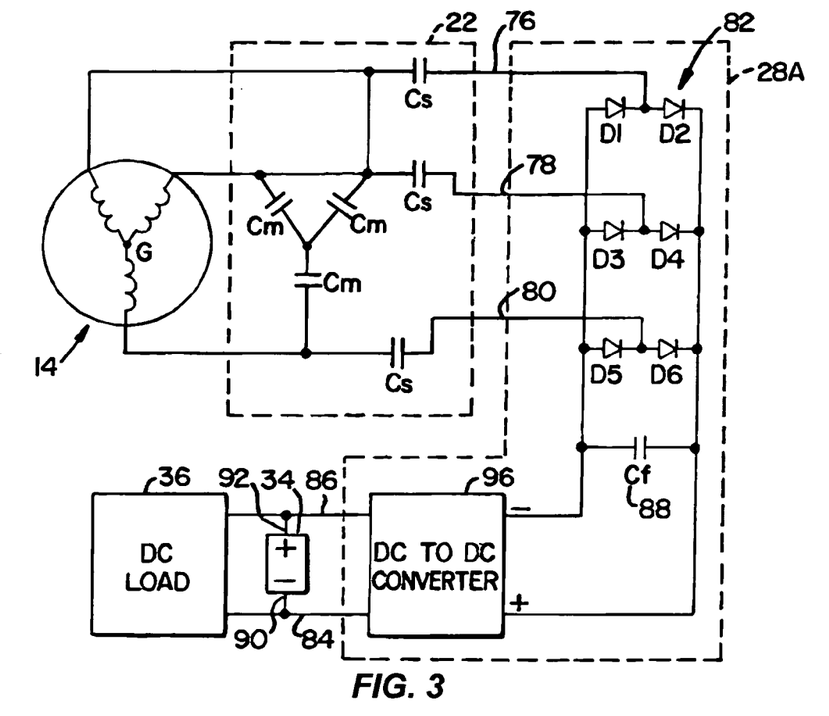
FIG. 3 illustrates an alternative to the embodiment of FIG. 2.

FIG. 3 shows an alternative embodiment of the invention with like reference numerals referring to like elements. The embodiment of FIG. 3 is like that of FIG. 2 but instead of transformer 74, AC to DC converter 28A uses a DC to DC voltage converter 96 to achieve the desired voltage level for powering DC load 36 and charging battery bank 34. Converter 96 typically uses switching transistors to change the DC voltage and current to a high frequency AC. A transformer in the converter then transforms this AC voltage to a different AC voltage which, when rectified, is equal to the desired DC output voltage. The advantage of this approach is that the AC voltage produced by the converter is of sufficiently high frequency so as to enable the converter's transformer to be considerably reduced in size, weight and cost compared to the transformer in the FIG. 2 embodiment. Control can still be by means of the servomechanism throttle control (discussed below), or it can be by conventional control techniques such as pulse width modulation (PWM) of the switching transistors in DC to DC converter 96. In the case of PWM control, the control module (FIG. 4 and FIG. 5A) connects to a PWM controller in DC to DC converter 96 which operates on the same feedback principle as the servomechanism throttle control.

Figure 4:
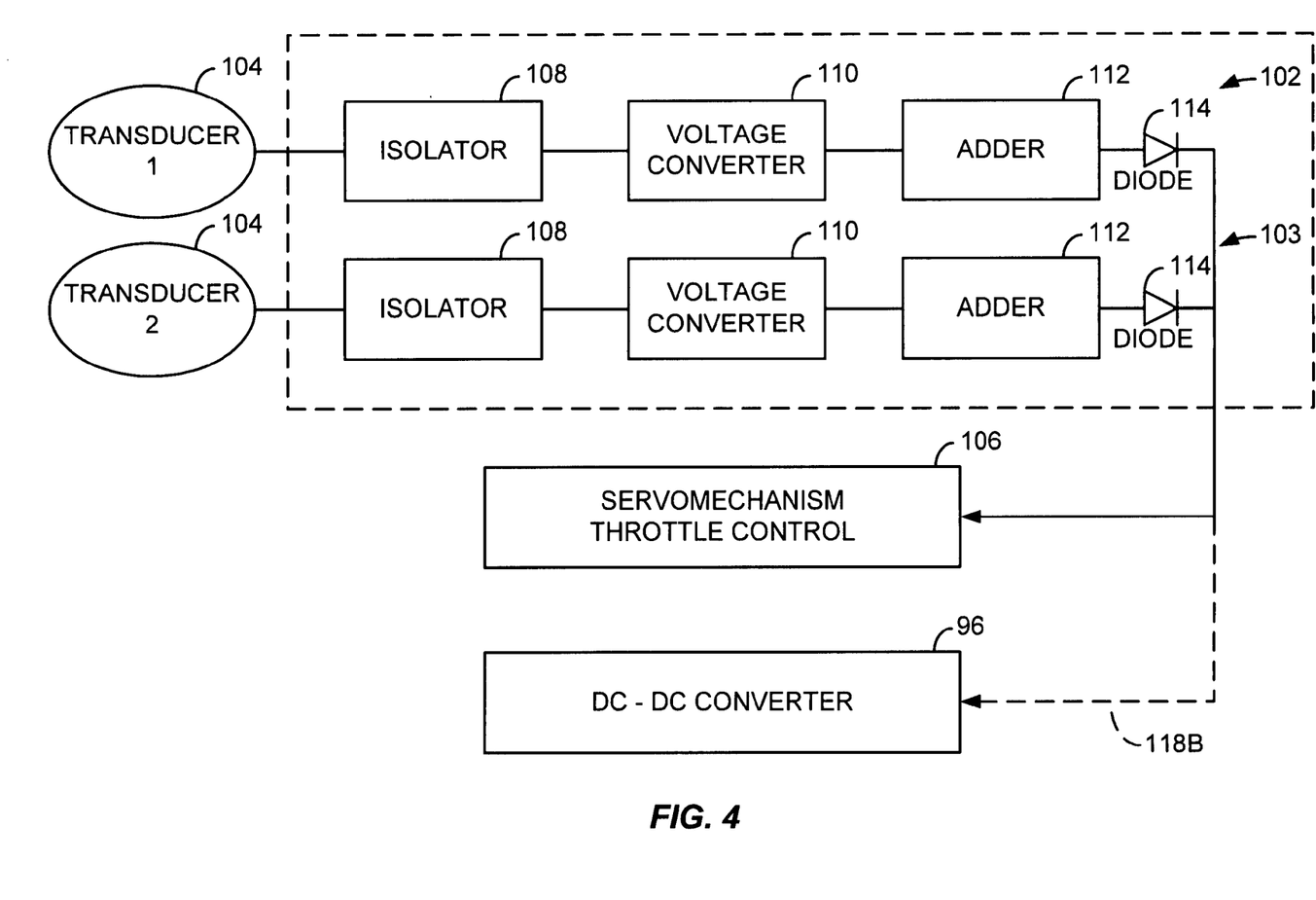
FIG. 4 illustrates two control modules made according to the invention.

Control of the various parameters in concert is preferably accomplished using one or more control modules, such as control modules 102, 103 shown in FIG. 4. Control modules 102,103 are substantially identical so that only control module 102 will be discussed. Control module 102 accepts an input from transducer 104, or other control signal source, and converts it to a voltage signal that is then fed to the servomechanism throttle control 106 or to the DC to DC converter 96. Control module 102 comprises isolator 108, typically an optoisolator or other such device that would have an output which is isolated from any connection that the transducer makes to the generator circuit. This then allows all control modules to be connected to a common power supply with a common ground, while isolating potentially dangerous voltages from the control circuit. Isolator 108 is coupled to a voltage converter 110, which could be a resistive voltage divider, an operational amplifier or other such device that converts (scales) the output voltage of the isolator to a voltage such that at the maximum desired value (critical value) of the parameter that is being measured (voltage, current, temperature, etc.), the converter output voltage is equal to some control voltage (e.g. 5 volts). Voltage converter 110 is connected to adder or summing circuit 112; in this embodiment circuit 112 is an operational amplifier, and it is designed to add 0.7 volts to the output voltage of the converter to offset the approximately 0.7 volts voltage drop created by a diode 114 (preferably a silicon type) used following adder 112. The cathodes of diodes 114 of modules 102 are then connected. (Alternatively, instead of a summing circuit before each diode, a single summing circuit could be placed after the diodes. Without the summing circuit(s) the control would still work but with a possible loss of accuracy.) In this manner, diodes 114 insure that the parameter that is at its maximum (critical) value will be the one that will be controlled so as to not exceed that maximum value.

Figure 5:
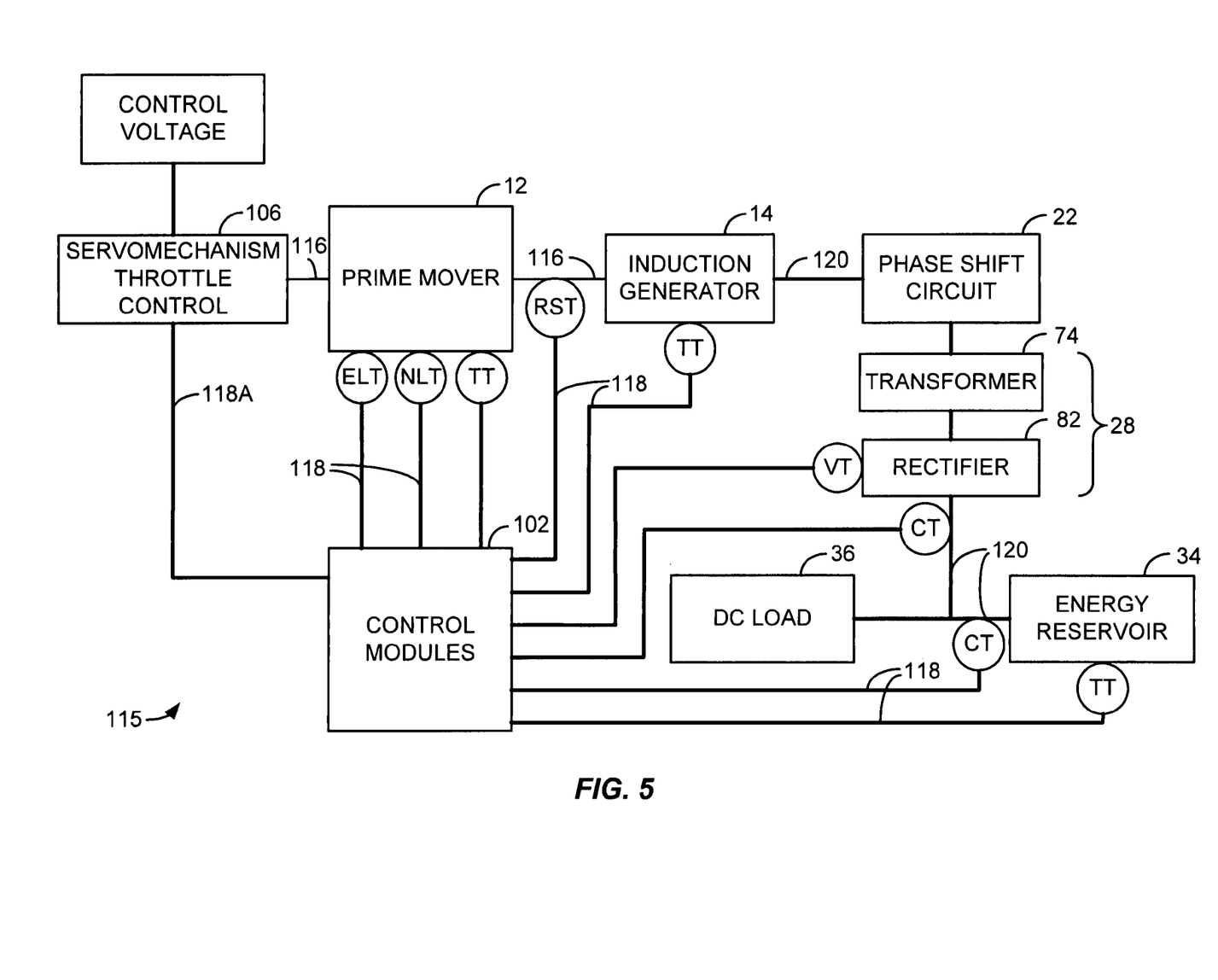
FIG. 5 shows, in schematic form, one example of the integration of the control modules of FIG. 4 with power supply components of FIG. 1.

FIG. 5 shows, in schematic form, a controlled induction generator power supply system 115 which integrates control modules of FIG. 4 with power supply components of FIG. 1. Mechanical connections are illustrated by thin lines 116, control circuit lines 118 and 118A are illustrated by medium thickness lines and main circuit lines 120 are illustrated by thick lines. Various types of transducers are used to monitor the performance of the system and provide control parameter signals to control module 102. In response, control module 102 sends a throttle control signal to throttle control 106 along a throttle control line 118A. The following transducers are used in the embodiment of FIG. 5: emissions level transducer ELT; noise level transducer NLT; temperature transducer TT; rotational speed transducer RST; voltage transducer VT; and current transducer CT. Additional transducers and other types of transducers can be used in addition to or as substitutes for the shown transducers. Fewer transducers can also be used. Servomechanism throttle control 106 is used to control the rotor speed of prime mover 12 based upon the inputs from the various transducers. The output voltage of an induction generator varies with rotor speed. Generator output current varies with generator voltage (through Ohm's Law), so generator output current therefore also varies with generator rotor speed. Thus, the invention uses throttle control in a closed loop system to control various parameters in addition to prime mover/generator rotor speed, such as generator output voltage (VT), generator output current (CT), noise level (NLT), emissions volume level (ELT) and engine or generator temperature (TT). The use of a properly sized energy reservoir 34 permits the parameters of interest to be controlled through throttle control without reducing power to the load.

Figure 5A:
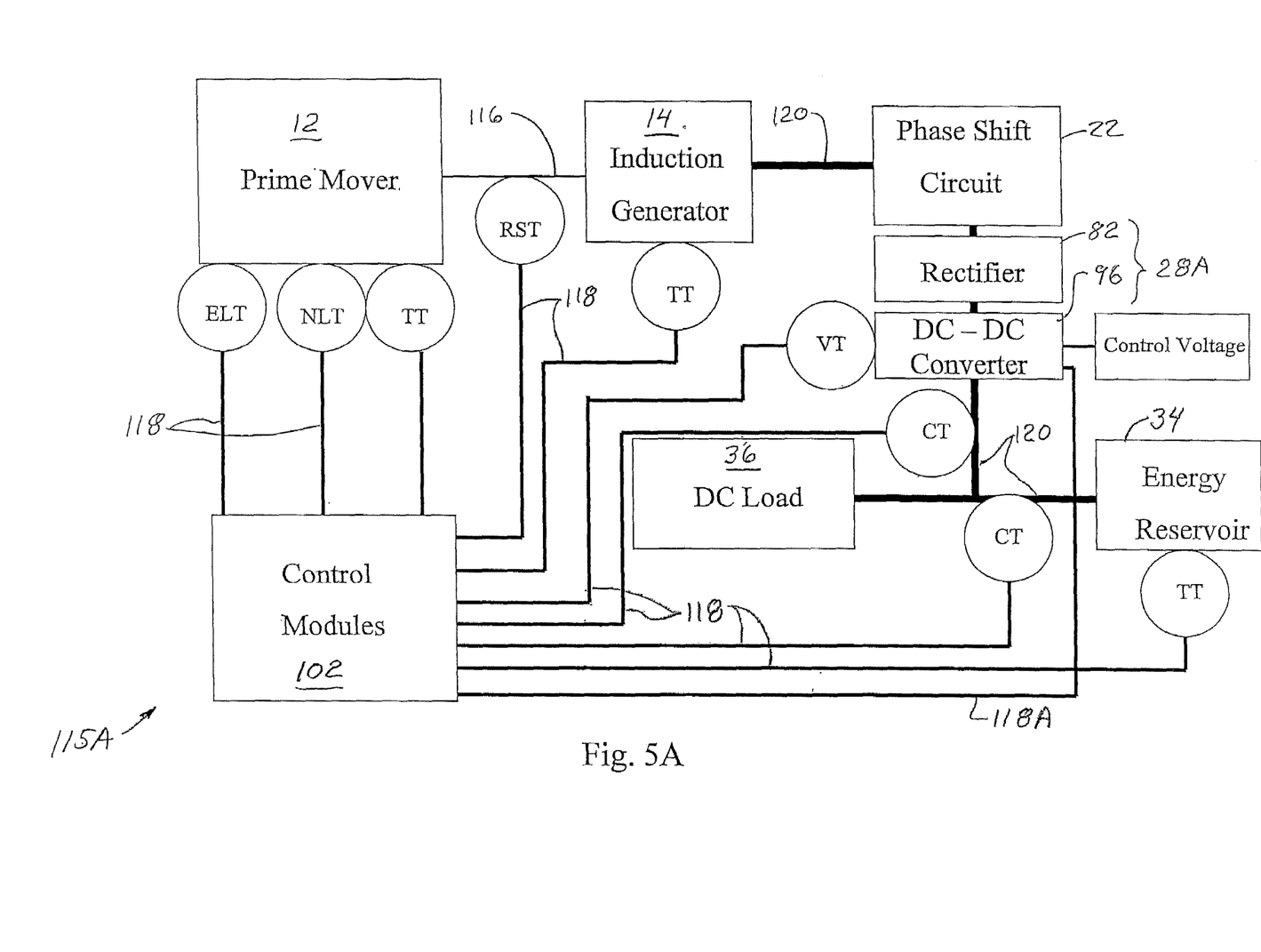
FIG. 5A is similar to FIG. 5 but incorporates the DC to DC converter of FIG. 3.

FIG. 5A shows, in schematic form, the alternative embodiment incorporating the DC-DC converter. Control module 102 sends a throttle control signal to DC-DC converter 96 along control line 118B. In this embodiment, as indicated by the dashed lines 118A, the servomechanism throttle control can still be used. Using conventional control techniques such as Pulse Width Modulation (PWM), the output voltage of the DC-DC converter can be controlled in a closed loop system similar to the servomechanism throttle control system, and the various parameters can then be controlled in much the same manner.

Magnetization Assist

When used for mechanical power applications or for independent power generation (i.e. not connected to the utility grid), induction generator 14 must be self energizing when starting up, in order to develop its output voltage. There is usually some residual magnetism in the rotor of the generator which is sufficient to generate some voltage at the generator output as the rotor begins to spin. This output voltage then causes a small magnetizing current to flow through the external magnetization capacitor circuit. This current increases the rotor magnetization, and the output voltage and the magnetizing current are then further increased, and in this manner the generator "bootstraps" itself up to full output voltage. However, under certain circumstances (such as if the generator is shut down under load) the rotor can become demagnetized to the point where there is not enough residual magnetization to initiate this process, and the generator will then not produce voltage. This can be overcome by the application of a small DC voltage across one of the phases for a short duration. Alternatively, additional capacitance can be switched in across one of the phases until the generator voltage begins to rise. FIG. 2 illustrates a method of achieving this magnetization assist by using the capacitors which are already in the circuit. By configuring magnetizing current capacitors 68, 70 and 72 in a wye connection, as is indicated, it is possible by means of a magnetization assist circuit 98, shown in dashed lines in FIG. 2, to temporarily short circuit one of the capacitors, such as first magnetization current capacitor 68, by closing a switch 100, with the result that the other two capacitors are then connected directly across two phases of the generator output. The capacitance across these two phases is three times the capacitance across those phases when wye connected, and this increased capacitance is sufficient to start the generator even when the rotor has been significantly demagnetized. After generator voltage begins to rise, the capacitors can then be switched back to their normal configuration. (With this feature, the voltage rating of magnetizing current capacitors 68, 70 and 72 must be equal or greater that the generator output voltage.)

Figure 6:
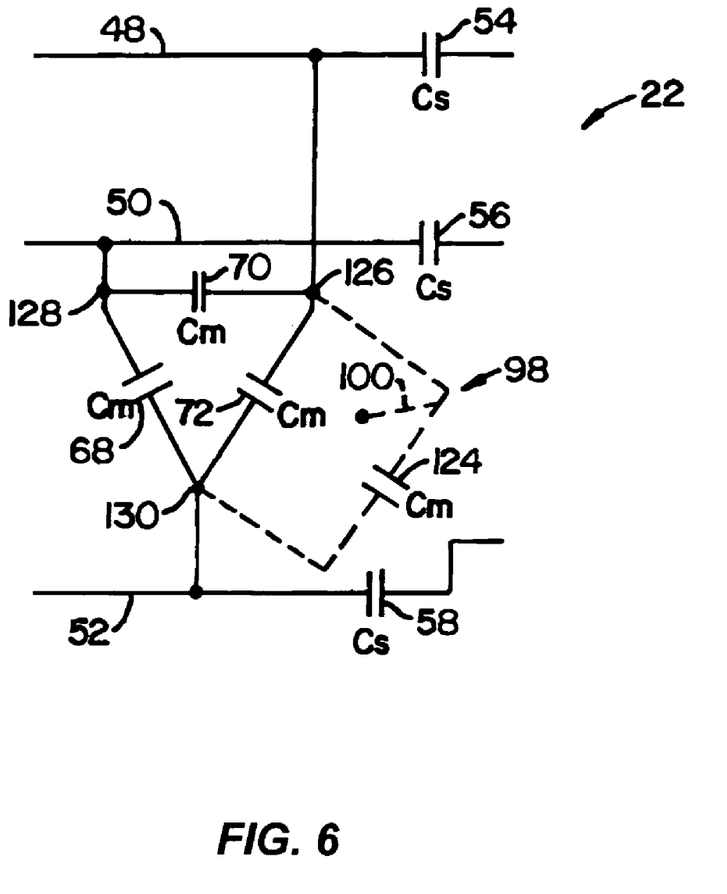
FIG. 6 illustrates an alternative embodiment of the phase shift circuit 22 of FIG. 2 in which the wye arrangement of the magnetizing current capacitors are placed in a delta arrangement.

FIG. 6 illustrates an alternative embodiment of the phase shift circuit 22 of FIG. 2 in which the wye arrangement of magnetizing current capacitors 68, 70 and 72 are placed in a delta arrangement. The delta arrangement of first, second and third magnetizing current capacitors 68, 70 and 72 has first, second and third junctions 126, 128 and 130 connected to the first, second and third phase shift lines 48, 50 and 52. Magnetization assist is provided by a magnetization assist capacitor 124 selectively placed across one of the magnetizing current capacitors 68, 70, 72, capacitor 72 in this embodiment. Alternatively, capacitor 124 could be replaced by a battery or other voltage source in series with a current limiting resistor to create a small, momentary current through one of the generator stator windings when switch 100 is closed and reopened. The need for capacitor 124 to provide magnetization assist when capacitors 68, 70 and 72 are in the delta arrangement, or the need for a battery or other voltage source will typically make the wye arrangement of FIG. 2 preferred over the delta arrangement of FIG. 6.

Control

Since generator output voltage varies with generator rotor speed, voltage control can be achieved by engine throttle control. This throttle control can be a simple servomechanism in a closed loop system, where the difference between a preset control voltage and a scaled output voltage is measured, and the resulting signal used to drive the servomechanism in the direction of reducing this difference by changing the engine throttle setting.

Battery charging can be a constant voltage process, a constant current process, or a multi stage process which typically starts as constant current and switches to constant voltage. For constant current, a current transducer (such as a shunt or Hall effect device) which converts current to voltage, must then be added. During a constant voltage charge, it is possible that the batteries will absorb current at an excessive rate and that damage to the batteries could result. It is therefore desirable to set a top limit on the charging current. It is also possible that a combination of battery charging current and load current will cause generator output to exceed a desired limit, and so a top limit may be set on the generator output current. Besides controlling voltage and current for battery charging purposes, there are many other parameters that it is useful to control. Battery temperature, internal generator temperature, engine temperature, generator rotational speed, noise level, and emissions volume level are all parameters that can be monitored and controlled using appropriate transducers which convert the parameter to a voltage. (Of course in the case where voltage itself is being measured, such as battery charging voltage, the "transducer" can be as simple as a voltage divider.)

The controls as described operate in an analog mode. Alternatively, the analog transducer outputs and the control voltage can be converted to digital data that is fed to an embedded microprocessor that performs the control functions of the control module and servomechanism but in a digital mode. The servomechanism can then consist of a stepper motor with appropriate mechanical connection to the throttle of the prime mover, where the stepper motor is driven by the digital output of the embedded microprocessor.

Operation

The operation of power supply 10 is as follows. When the magnitude of the required load power is greater than the generator output power, the power difference is then made up by battery bank 34. (If the generator is not running, then the load would of course be powered entirely by the battery bank.) When the magnitude of the load power is less than the generator output power, then the generator is simultaneously powering DC load 36 and charging battery bank 34. At some point where the load power is sufficiently low, and the level of charge of the batteries is sufficiently high, the generator is running at a decreased power level and decreased efficiency level and so the control system shuts down the generator. When a load of sufficient magnitude is again present, and/or the battery bank reaches a certain level of discharge, the generator is started up again. The generator, when running, is therefore operating at a fairly constant level of speed and power with the result of enhanced fuel economy and reduced emissions levels. When used in applications requiring mechanical power such as hybrid electric vehicles, the resistive load would typically consist of a DC motor with motor controller. When used in applications requiring AC electrical power, the resistive load would consist of a DC to AC inverter, as described above. As with the battery bank, these components must be sized so as to be capable of powering the higher than average loads for expected periods of duration at the expected power levels. (Modern sine wave inverters, as well as DC motors, typically have peak power capabilities that are at least twice their continuous power ratings. Lead acid batteries are generally capable of producing short term output current ("cold cranking amps") that is at least ten times the maximum recommended charging current.)

Overspeeding

The conversion of the generator output from AC to DC makes it possible to take advantage of a unique characteristic of the induction motor. The rotor of a lower speed induction motor (such as an 1800 RPM synchronous speed unit), has basically the same mechanical construction as the rotor of a higher speed induction motor of the same power rating (such as a 3600 RPM synchronous speed unit.) (The main difference in the two motors is that the lower speed motor has more poles in the stator.) The rotor of the lower speed motor can therefore usually be operated at speeds over its rating, and for typical standard motors up to 20 HP with direct drive, the rotor of the 1800 RPM motor can be driven to 3600 RPM. The National Electrical Manufacturers Association (NEMA) has published tables of maximum safe operating speeds for various size motors. The published overspeeds range from about 100 percent greater than the rated speed for smaller motors, such as ¼ HP-20 HP motors, to about 25 percent greater than the rated speed for larger motors, such as 200-300 HP motors. (See NEMA publication MG 1-1993, Revision 1 Part 30, Page 5, Table 30-1.) This overspeed capability also applies when using the motor as a generator. Since the no-load output voltage and the output frequency of the generator vary directly with rotor speed, the result is a voltage and frequency increase. For example, a typical 20 HP (15 kW), 60 Hz induction motor has a dual voltage rating of 230/460 volts. Therefore if such a motor with a synchronous speed of 1800 RPM were connected for 230 volt input and the rotor is then turned at 3600 RPM, the no-load output voltage as a generator would be 230(3600)/1800 or 460 volts and the output frequency would be 60(3600)/1800 or 120 Hz. The 460 volt output level is within the voltage rating of the stator windings since the motor input voltage rating is 230/460 volts. The higher frequency causes some additional heating of the generator lamination steel since losses from eddy currents and hysteresis increase with increasing frequency. However, tests indicate that this is not a serious problem. (Of course if such a generator were used for normal AC operation, this higher frequency would present a problem, since AC frequency must be kept within a very small range for such operation. However, since in the invention, the AC power is being converted to DC, this presents no problem.) The output current rating of the generator is basically unchanged, since the current rating is primarily dependent on stator wire size. (The higher speed of rotation will result in some additional cooling which could allow a slightly higher output current level without a corresponding temperature rise in the wire.) Therefore, output voltage has doubled, output current is virtually unchanged and so output power (voltage x current for resistive loads) is approximately double the motor power rating, or 30 kW.

It is recognized that the induction generator could operate at overspeeds less than or substantially less than 25%; doing so will, however, result in the partial loss of the advantages gained from the operation at higher overspeeds. Therefore, while overspeeds of less than 10% are possible and practical in some situations, they will not obtain all of the advantages which accrue through the use of the higher overspeeds. Therefore, the overspeed should be at least about 10%, 25%, 50% or 75% greater than the rated speed, or about 10 to 300%, 25 to 300%, or 50 to 100% greater than the rated speed.

If the speed—power characteristics of induction motors as shown in the above referenced NEMA Table 30-1 are matched to the speed—power characteristics of Diesel engines of the same power ratings, a very important conclusion can be drawn. Diesel engines are well matched to such a generator over a wide power range, and it is therefore practical to directly drive the generator from such an engine. Therefore this highly efficient and widely available type of engine becomes a very practical prime mover for such a generator, and the direct drive capability avoids the losses, noise, reliability issues and maintenance associated with gears or belt drives or other means of transmitting power.

Good operating practice dictates that the longevity of a machine can be increased by operating at levels that are below rating. A 10% derating would therefore result in a 3600 RPM rated engine that is operated at 3240 RPM and a generator with a current rating of 1, that is operated at 0.9I. Using an 1800 RPM synchronous speed induction motor directly coupled to the shaft of such an engine, the no-load output voltage of the generator would then be 3240/1800 or 1.8 times the motor's rated voltage and the volt ampere rating of the generator would be 1.8(0.9) or 1.62 times the volt ampere rating of the motor. In actual practice, induction generator continuous power ratings of 1.6 times the motor power ratings are easily achievable. The power to weight and power to volume ratios, and the cost effectiveness of the generator are therefore enhanced by utilizing this overspeeding capability.

Other Features—Cogeneration

When the prime mover is an engine, heat that is removed by air cooling or water cooling can be utilized advantageously. For example, in the case of a hybrid electric vehicle, this heat could be used for passenger compartment heating, and in the case of independent power generation, this heat could be used for space heating, water heating or for industrial process heating requirements.

Advantages

The invention, by utilizing induction motors in this novel manner, makes hybrid electric technology much more practical than was previously possible, and in some cases such as very large systems, the invention might represent the only means of making this technology practical and realizing its advantages.

Some of these advantages are evident when AC power generation using hybrid electric technology is compared to operation of a conventional AC generator. A conventional AC generator must be sized to meet peak load power requirements, which might be considerably greater that the average power requirements. This generator must be running whenever there is any load, even a load which is very small compared to the generator capacity. This is very inefficient. In addition there may be some load present at all hours of the day so the generator must run continuously, and can not be cycled on and off as with hybrid electric technology. The varying load levels not only increase the inefficiency but such operation increases emissions levels. Also the conventional AC generator must always run at its full rated speed, since the AC frequency must be kept virtually constant, and this frequency is determined by generator speed. In addition, if used in conjunction with the utility power grid, such a system cannot function as an uninterruptible power supply without the addition of auxiliary equipment because of the delay in starting up the generator unit when normal power fails.

Hybrid electric technology independent AC power generation has the advantage of being useable as an uninterruptible power supply (UPS). In this mode, the inverter monitors the voltage from the normal power source (e.g. the utility power grid), and if this power fails, the inverter turns on within milliseconds to provide virtually uninterrupted power to the load. As previously described, the generator would then start up when conditions merit.

Another advantage of this technology is simplicity of control. The servomechanism throttle control is very rugged, reliable and simple. In the case of conventional technology such as the conventional AC generator, such a simple throttle control is not an option since frequency must be kept virtually constant. Voltage control must be achieved by means such as a winding on the rotor, or solid state devices on the output, and these add cost and complexity, while decreasing reliability.

The ability to control numerous and varied parameters is also an advantage of this technology. In many types of machinery that are driven by a prime mover, the speed and power of the prime mover are dictated by the load demand. Again, the example of the conventional AC generator demonstrates this in that the speed must be kept virtually constant since frequency must be kept constant. Power output is dictated by the load. Therefore, if a parameter such as a maximum internal generator temperature is exceeded, the remedies are typically to reduce the power to the load or to shut down the generator entirely. Either of these alternatives may be inconvenient or problematical. Hybrid electric technology has an advantage in that the buffering nature of the energy storage device allows the prime mover—generator combination to be decoupled from the load, and so there is a third option available. This is the option of decreasing the output voltage of the generator. Using the servomechanism throttle control, the speed and therefore power output of the prime mover and the voltage of the generator can then be decreased to the point where the temperature (or other critical parameter) can be maintained at or below its maximum desired level. If the energy reservoir is sized properly, power to the load can then remain unchanged. In this manner, the many and varied parameters previously described (current, temperature, generator rotational speed, noise level, emissions volume level, etc.) can be controlled.

Any and all patents, patent applications and printed publications referred to above are incorporated by reference.

The invention claimed is:

1. A method for enhancing the operation of an electrical power supply comprising:

selecting a prime mover having a chosen power rating;
    choosing an induction motor having a first power rating at a rated speed and a second power rating at an overspeed, said overspeed being at least about 10% greater than the rated speed;
    said choosing step further comprising choosing the induction motor such that the second power rating is substantially equal to the chosen power rating;
    driving the induction motor with the prime mover so that the induction motor acts as an induction generator; and
    operating the induction generator at said overspeed.

2. The method according to claim 1 wherein the prime mover selecting step is carried out by selecting a diesel engine.

3. The method according to claim 1 wherein the driving step is carried out by directly driving the induction generator with the prime mover.

4. The method according to claim 1 wherein said choosing step is carried out so that the overspeed is at least about 25% greater than the rated speed.

5. The method according to claim 1 wherein said choosing step is carried out so that the overspeed is at least about 50% greater than the rated speed.

6. The method according to claim 1 wherein said choosing step is carried out so that the overspeed is at least about 75% greater than the rated speed.

7. The method according to claim 1 wherein said choosing step is carried out so that the overspeed is about 10 to 300% greater than the rated speed.

8. The method according to claim 1 wherein said choosing step is carried out so that the overspeed is about 25 to 300% greater than the rated speed.

9. The method according to claim 1 wherein said choosing step is carried out so that the overspeed is about 50 to 100% greater than the rated speed.

10. A controlled induction generator power supply system comprising:

an induction generator power supply comprising:
        a prime mover comprising a throttle and a prime mover output;
        an induction motor operably connected to the prime mover output so that the induction motor acts as an induction generator, the induction motor comprising a generator output;
        an energy reservoir having a reservoir input; and
        a circuit electrically coupling the generator output with the reservoir input to provide the energy reservoir with energy;
    a control module;
    a transducer operably coupled to the induction generator power supply and to the control module, the transducer adapted to monitor the performance of the power supply and to provide the control module with a control parameter signal;
    a servomechanism throttle control operably coupled to the control module along a throttle control line and to the throttle; and
    the control module providing the throttle control with a throttle control signal along the throttle control line in response to the control parameter signal.

11. The system according to claim 10 wherein the induction generator is mechanically connected to the prime mover output.

12. The system according to claim 11 wherein the mechanical connection is a direct drive connection.

13. The system according to claim 10 wherein the control module comprises:

an isolator comprising an isolator input coupleable to a control signal source and an isolator output;
    a voltage converter, having a converter input connected to the isolator output and a converter output, configured to convert a first voltage of a first signal at the isolator input to a second voltage of a second signal at the converter output, said first voltage having a first, expected maximum value, said second voltage having a second maximum value corresponding to the first maximum value, said second maximum value equal to a chosen control voltage; and
    a diode having a diode input coupled to the converter output and a diode output, said diode output coupleable to a power supply control device.

14. The system according to claim 10 wherein the control module comprises:

an isolator comprising an isolator input coupleable to a control signal source and an isolator output;
    an analog to digital converter, having a converter input connected to the isolator output; and
    a microprocessor, having a microprocessor input connected to the converter output, said microprocessor output coupleable to a power supply control device.

15. A controlled induction generator power supply system comprising:

an induction generator power supply comprising:
        a prime mover comprising a prime mover output;
        an induction motor operably connected to the prime mover output so that the induction motor acts as an induction generator, the induction motor comprising a generator output;

an energy reservoir having a reservoir input; and
a circuit electrically coupling the generator output with the reservoir input to provide the energy reservoir with energy, said circuit comprising a DC to DC converter;
a control module operably coupled to the DC to DC converter by a control line;
a transducer operably coupled to the induction generator power supply and to the control module, the transducer adapted to monitor the performance of the power supply and to provide the control module with a control parameter signal; and
the control module providing the DC to DC converter with a control signal along the control line in response to the control parameter signal.

16. The system according to claim 15 wherein the control module comprises:
an isolator comprising an isolator input coupleable to a control signal source and an isolator output;
a voltage converter, having a converter input connected to the isolator output and a converter output, configured to convert a first voltage of a first signal at the isolator input to a second voltage of a second signal at the converter output, said first voltage having a first, expected maximum value, said second voltage having a second maximum value corresponding to the first maximum value, said second maximum value equal to a chosen reference voltage; and
a diode having a diode input coupled to the converter output and a diode output, said diode output coupleable to a power supply control device.

17. The system according to claim 15 wherein the control module comprises:
an isolator comprising an isolator input coupleable to a control signal source and an isolator output; and
an analog to digital converter, having a converter input connected to the isolator output a microprocessor, having a microprocessor input connected to the converter output, said microprocessor output coupleable to a power supply control device.

18. A method for enhancing the performance of an electrical power supply comprising:
selecting a prime mover having a chosen power rating;
choosing an induction motor;
operably connecting the induction motor to the prime mover so that the induction motor acts as an induction generator, said induction motor comprising a generator output, a first power rating at a rated speed and a second power rating at an overspeed, said second power rating being substantially equal to the chosen power rating, said overspeed being at least about 10% greater than the rated speed;
connecting a circuit input of a phase shift circuit to the generator output;
connecting a converter input of an AC to DC converter to a circuit output of the phase shift circuit; and
connecting a reservoir input of an energy reservoir to a converter output of the AC to DC converter;
whereby the induction generator may be driven by the prime mover and operated at said overspeed.

19. The method according to claim 18 wherein said choosing step is carried out so that the overspeed is at least about 25% greater than the rated speed.

20. The method according to claim 18 wherein said choosing step is carried out so that the overspeed is at least about 50% greater than the rated speed.

21. The method according to claim 18 wherein said choosing step is carried out so that the overspeed is at least about 75% greater than the rated speed.

22. The method according to claim 18 wherein said choosing step is carried out so that the overspeed is about 10 to 300% greater than the rated speed.

23. The method according to claim 18 wherein said choosing step is carried out so that the overspeed is about 25 to 300% greater than the rated speed.

24. The method according to claim 18 wherein said choosing step is carried out so that the overspeed is about 50 to 100% greater than the rated speed.

* * * * *